United States Patent
Clark et al.

(10) Patent No.: US 6,515,701 B2
(45) Date of Patent: Feb. 4, 2003

(54) FOCAL PLANE EXPOSURE CONTROL SYSTEM FOR CMOS AREA IMAGE SENSORS

(75) Inventors: Vincent S. Clark, Arlington, MA (US); Peter K. Duane, Boston, MA (US); R. Daniel McGrath, Andover, MA (US)

(73) Assignee: Polaroid Corporation, Cambridge, MA (US)

( * ) Notice: Subject to any disclaimer, the term of this patent is extended or adjusted under 35 U.S.C. 154(b) by 29 days.

(21) Appl. No.: 08/899,560

(22) Filed: Jul. 24, 1997

(65) Prior Publication Data

US 2001/0005225 A1 Jun. 28, 2001

(51) Int. Cl.$^7$ ............................................. H04N 5/335
(52) U.S. Cl. ..................................................... 348/308
(58) Field of Search ................................ 348/300, 302, 348/308

(56) References Cited

U.S. PATENT DOCUMENTS

| | | | |
|---|---|---|---|
| 4,984,088 A | | 1/1991 | Tani et al. .................... 358/228 |
| 5,101,270 A | * | 3/1992 | Boone et al. .................. 348/61 |
| 5,247,367 A | | 9/1993 | Lee .......................... 358/213.9 |
| 5,262,871 A | | 11/1993 | Wilder et al. ................. 358/213 |
| 5,303,052 A | | 4/1994 | Narabu et al. ................ 348/299 |
| 5,341,220 A | | 8/1994 | Juen ........................... 348/296 |
| 5,345,266 A | | 9/1994 | Denyer ........................ 348/300 |
| 5,410,348 A | | 4/1995 | Hamasaki ..................... 348/296 |
| 5,541,402 A | * | 7/1996 | Ackland et al. .......... 250/208.1 |
| 5,541,654 A | * | 7/1996 | Roberts ........................ 348/302 |
| 5,835,956 A | * | 11/1998 | Park et al. .................... 711/167 |
| 6,141,048 A | * | 10/2000 | Meyers ......................... 348/294 |

FOREIGN PATENT DOCUMENTS

| | | | |
|---|---|---|---|
| EP | 0 569 202 A2 | 11/1993 | ............ H04N/3/15 |
| FR | 2 538 651 A1 | 12/1982 | ............ H04N/3/15 |

OTHER PUBLICATIONS

McGrath et al., Current–Mediated, Current–Reset 768×512 Active Pixel Sensor Array, Feb. 1997, IEEE International Solid–State Circuits Conference.*
Goodenough F: "Get Ready for TV Cameras on a Chip" Electronic Design, vol. 44, No. 4, Feb. 19, 1996, p. 125.

* cited by examiner

Primary Examiner—Aung S. Moe

(57) ABSTRACT

An electronic exposure control system for an active pixel CMOS image sensor includes a row decoder and a column decoder for respective row-wise and column-wise addressing of the image signal generating pixels. The decoders receive row and column addresses and control signals from a controller. The row addresses received by the row decoder are alternately switched between a predetermined row address for resetting the image signals of pixels in said row and another predetermined spaced apart row address for enabling the image signals of pixels in said selected row to be read out by the column decoder. By providing a predetermined sequence of row addresses, a "rolling shutter" can be created and/or the exposure time of the pixels can be selected to be different from the time to expose an entire frame. The image sensor can also be operated in an interlaced mode and/or specific areas on the image sensor can be selected to be reset and read out.

9 Claims, 4 Drawing Sheets

FOCAL PLANE EXPOSURE CONTROL SYSTEM FOR CMOS AREA IMAGE SENSORS

BACKGROUND OF THE INVENTION

1. Field of the Invention

The invention relates to an electronic exposure control system for a solid state image sensor, in particular for active pixel MOS image sensor (CMOS), and a method for using the same. More particularly, the invention relates to a "rolling readout" for the CMOS image sensor using row decoders wherein the pixel exposure time is different from the frame time and rows can be read out non-sequentially, one row at a time.

2. Background of the Invention

There are basically two types of solid state image sensors used for image acquisition, charge coupled devices (CCD) and CMOS sensors. Although CCD image sensors have found wide-spread applications, for example in electronic movie and still cameras, the process used for their fabrication is specialized and different from the process used for manufacturing other commonly used integrated electronic circuits (IC), such as microprocessors, employing MOS technology.

The individual radiation sensing elements (pixels) in a CMOS array are basically reverse-biased semiconductor junctions of the type normally used to form source and drain regions of MOS transistors. Radiation is detected by first applying a large reverse bias to the device (reset), by subsequently isolating the device from the reverse bias voltage, and by then measuring the decrease in the charge stored in the reverse-bias junction capacitance of the device by either sensing the reverse-bias potential (voltage-mediated sensing or read-out) or by integrating the reverse-bias current flowing through the device (current-mediated sensing or read-out). The reset function can also be executed by either a voltage source (voltage reset) or a current source (current reset). The features of a current-mediated active-pixel image sensing device are described in detail in U.S. application Ser. No. 08/595,981 by McGrath et al., entitled "Current-mediated active-pixel image sensing device with current reset" which is assigned to the same assignee as the present invention and which is incorporated herein by reference.

Electronic image sensors, not unlike conventional film, have a certain exposure range; if the exposure time is too short, almost no charge is drained from the reverse-biased junction, resulting in a very small voltage drop which is difficult to measure and consequently results in a large noise-to-signal ratio; if the exposure time is too long, almost all charge will be drained for the majority of pixels, thereby providing little image content or image contrast. It is therefore important to provide shutter means for limiting the exposure of the pixels to incoming radiation. This can be accomplished either by mechanical means, for example by providing the imaging system incorporating the electronic image sensor with a mechanical shutter, like the shutter in a photographic camera using film, as described, for example, in U.S. Pat. No. 5,341,220, or by electronic means, such as variable pre-amplifiers or by controlling the time between reset and read-out of pixels as a function of the intensity of the incoming radiation. The latter approach is commonly referred to as an "electronic shutter."

An electronic shutter for a linear CCD array is, for example, described in U.S. Pat. No. 5,303,052 wherein a shutter timing unit generates between read-out pulses a shutter pulse for draining to a special drain region excess charge accumulated in the CCD pixels. A similar concept for CCD video area image sensors is described in U.S. Pat. No. 5,247,367 wherein the shutter speed is controlled by adaptively varying the duration of light storage of the CCD for every vertical frame period in response to the radiative intensity.

The pixel signals of CMOS image sensors are conventionally read out differently from CCD image sensors. All pixels in each row are commonly addressed by digital circuitry, such as a shift register, one row at a time, either to be reset or to be selected for read out. When a row is enabled for read out, columns are preferably sequentially selected and the pixel signal of pixel at a commonly selected row and column is read out by a charge sense amplifiers connected to the column lines. Such a read-out method is described, for example, in U.S. Pat. No. 5,345,266.

In many cases, shift registers are used in the digital circuitry for row (and also column addressing). Shift register addressing allows simple operation of the sensor. Addressing a row requires placing a "one" at the input of the shift register and then shifting the appropriate number of rows.

It is possible to provide with row addressing via a shift register, a pixel exposure time which is shorter than the frame time. This is accomplished by resetting a first row at the beginning of a frame using a first shift register, by then consecutively resetting succeeding rows, one row at a time, with the first shift register, and by reading the first row at a later time which is less than the frame time, using a second shift register which is delayed with respect to the first shift register by a certain number of rows which is less than the number of rows in the frame. A shutter of this type is described, for example, in U.S. Pat. No. 5,410,348, using two row shift registers. Shift registers, however, are disadvantageous in that once the read-out time has been set by specifying the delay time between the two shift registers, this delay time cannot be changed at a later time unless the shift registers are reset to their start address, making it difficult to read out partial frames and to dynamically adapt the "electronic exposure time" to changing illumination conditions.

The disadvantages of the method described above can be obviated by employing decoders instead of shift registers. With decoder addressing, a specific row is selected by placing a word at the input to the decoder. One word each is required per horizontal or vertical direction. Decoder addressing requires more I/O but is more versatile. Regions of interest can be read out as well as various other non-sequential read-out schemes for exposure control can be envisioned.

SUMMARY OF THE INVENTION

With the foregoing in mind, it is therefore an object of the invention to provide an improved control system for controlling the exposure of pixels of a CMOS image sensor to incident optical radiation. Preferably, the control system uses decoders for row-wise and column-wise addressing the pixels. The CMOS image sensors can be a current-mediated active-pixel image sensing device.

It is another object of the invention to provide decoder addressing for the rows of radiation-sensitive pixels of a CMOS image sensor, wherein the pixel exposure time can be less or greater than the frame time.

It is a further object of the invention to provide decoder addressing for the rows of radiation-sensitive pixels of a CMOS image sensor, wherein the pixel exposure time can be changed easily during one frame time.

It is another object of the invention to enable read-out of areas of the image sensor which are smaller than the total imaging area of the image sensor.

It is another object of the invention to enable read-out of non-sequential rows of radiation-sensitive pixels of a CMOS image sensor, e.g. of interlaced rows, during one frame time.

These objectives are achieved by connecting the input of a CMOS image sensor having two input lines per row, a first row input line for resetting and a second row input line for selecting pixels in one row to be read out by a column decoder, in parallel to respective output terminals of a row decoder. The input of the row decoder is connected to a reset and a select counter, respectively, via respective buffer amplifiers. The reset counter and the select counter, respectively, are connected to an "intelligent" controller to receive input signals from the output of the controller. The input signals include row clock pulses, start and stop addresses of the rows defining the row-wise imaging area, respective reset enable pulses and select enable pulses, a load enable pulse for loading the start and stop addresses into the respective counters and a preset incremental value for the row count. The select enable pulse is delayed with respect to the reset enable pulse by a certain number of row clock cycles defining the "height" of the rolling focal plane shutter and thus the respective pixel integration time.

The input signals received by the reset counter and the select counter, respectively, include the row addresses and the reset and select enabling signals; these addresses and enabling signals are alternately switched during one row clock cycle by the respective buffer amplifier. Pixels in columns can be addressed and the signals stored therein can be read out by a column decoder, which can also be controlled by the "intelligent" controller. The exposure information contained in the pixels can also be used to modify the output signals supplied by the "intelligent" controller. Both the exposure time of pixels and the area of the image sensor addressed for reset and readout can thus be changed in response to the image content.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Figure 1:
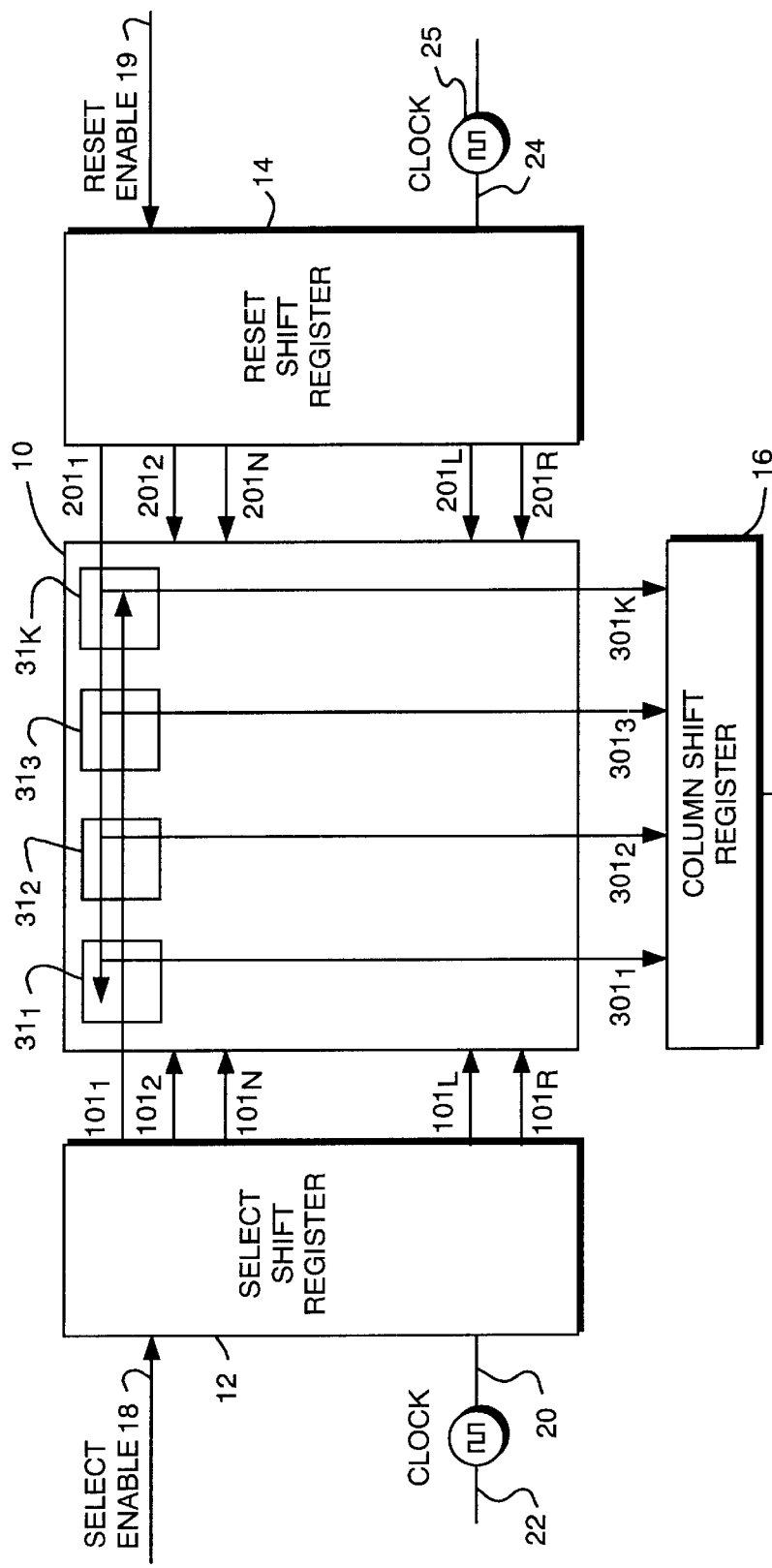
FIG. 1 a schematic block diagram of a CMOS image sensor with conventional shift register addressing for row-wise pixel reset and readout.

Referring now to FIG. 1, there is shown a schematic block diagram of a CMOS image sensor 10 addressed in a conventional manner by shift registers 12, 14. The CMOS image sensor 10 comprises pixels $31_1$, $31_2$, $31_3$, $31_K$ arranged in, for example, R horizontal rows and K vertical columns (only representative pixels in the first row are shown for clarity, with the index K representing the last column), with each pixel in every. one row, on one hand, connected to a common row select line $101_1$, $101_2$, ..., $101_N$, ..., $101_L$, ..., $101_R$ for enabling readout of information stored in each pixel of the respective row and, on the other hand, connected to a common row reset line $201_1$, $201_2$, ..., $201_N$, ..., $201_L$, ..., $201_R$ for resetting all pixels in the respective row. A CMOS image sensor of this type is, for example, described the above-referenced U.S. patent application Ser. No. 08/595, 981. On one side of the image sensor, there is provided a select shift register 12 having R logical outputs, each of said logical outputs connected to one of the row select lines $101_1$, $101_2$, ..., $101_N$, ..., $101_L$, ..., $101_R$ for enabling the respective row of pixels to be read pixel-wise by a column shift register 16, with the image information provided at an output 17. On the other side of the image sensor, there is provided a reset shift register 14 also having R logical outputs, each of said logical outputs connected to one of the row reset lines $201_1$, $201_2$, ..., $201_N$, ..., $201_L$, ..., $201_R$ for resetting one row of pixels. The input of each shift register 12, 14, respectively, is connected to clocks 22, 25, respectively, for receiving row clock pulses via row clock input lines 20, 24, respectively. The output of the column shift register 16 is connected in parallel to the column inputs of the CMOS image sensor 10 via column enable lines $301_1$, $301_2$, $301_3$, ..., $309_K$, one column enable line for each column of the image sensor. The signal readout lines, one readout line associated with each column enable line, for reading the signal information generated by the pixels in response to exposure to optical radiation and supplied to output 17, are not shown. Shift registers of this type and the use thereof for addressing image sensor arrays are known in the art and will not be discussed here in detail. Also not shown are the reset inputs for resetting and addressing each of the shift registers 12, 14, 16.

The operation of this conventional electronic shutter can be best understood with reference to FIG. 1. The underlying concept is that a specific row N is read out exactly M row clock cycles after the row L spaced apart M rows from said row N is reset. In the present example, row L is reset by applying a logical signal to reset line $201_L$; row N is enabled for readout by applying a logical signal to select line $101_N$. When the process starts, the reset shift register 14 is enabled by receiving a logical signal at input 19, whereby row reset line $201_1$ resets the first row of the device. During subsequent row clock pulses, reset line $201_2$ resets the pixels in row 2, etc., until row M is reset via rest line $201_M$. At this point, the select shift register 12 is enabled by a logical signal at its input 18 and begins counting. Row select line $101_1$ enables the first row for readout. When row 1 is enabled, the pixels in the first row are sequentially enabled for read-out by column shift register 16 via the column select lines $301_1$, $301_2$, ..., $301_3$, ..., $309_K$ and read out via the associated column signal lines in a manner known in the art, thereby providing an image signal at an output 17. Hereafter, the row following row $201_{M+1}$ is reset and the second row is enabled by select line $101_2$ and read out. This process is continuous, meaning that the row which is read out, is always spaced apart M rows from the row which is reset. The value of M is usually less than the number N of rows in the device. This readout method will hereinafter be referred to as "rolling readout." After the last row is reset, the process can either be terminated or "wrap around" to start anew with row 1.

Shift registers are disadvantageous in that they generally have to be reset to 1, i.e. the count is restarted at row 1.

Consequently, it is are generally difficult to read out partial frames and the readout time cannot be shorter than the frame time.

Furthermore, shift registers have to be reset to the start position 1 if the value M is to be changed, e.g. in response to changing illumination conditions.

It is known in the art to substitute decoders for shift registers. Decoders receive at the input a word address, for example encoded in binary, hexadecimal or similar notation, and are capable of addressing at the output separate output lines, with each output line corresponding to a different word address and/or a combination of a word address and other logical input signals. Decoders can be fabricated on the same chip and by the same process as the CMOS image sensor. Consequently, decoder addressing provides a significantly enhanced addressing functionality.

Figure 2:
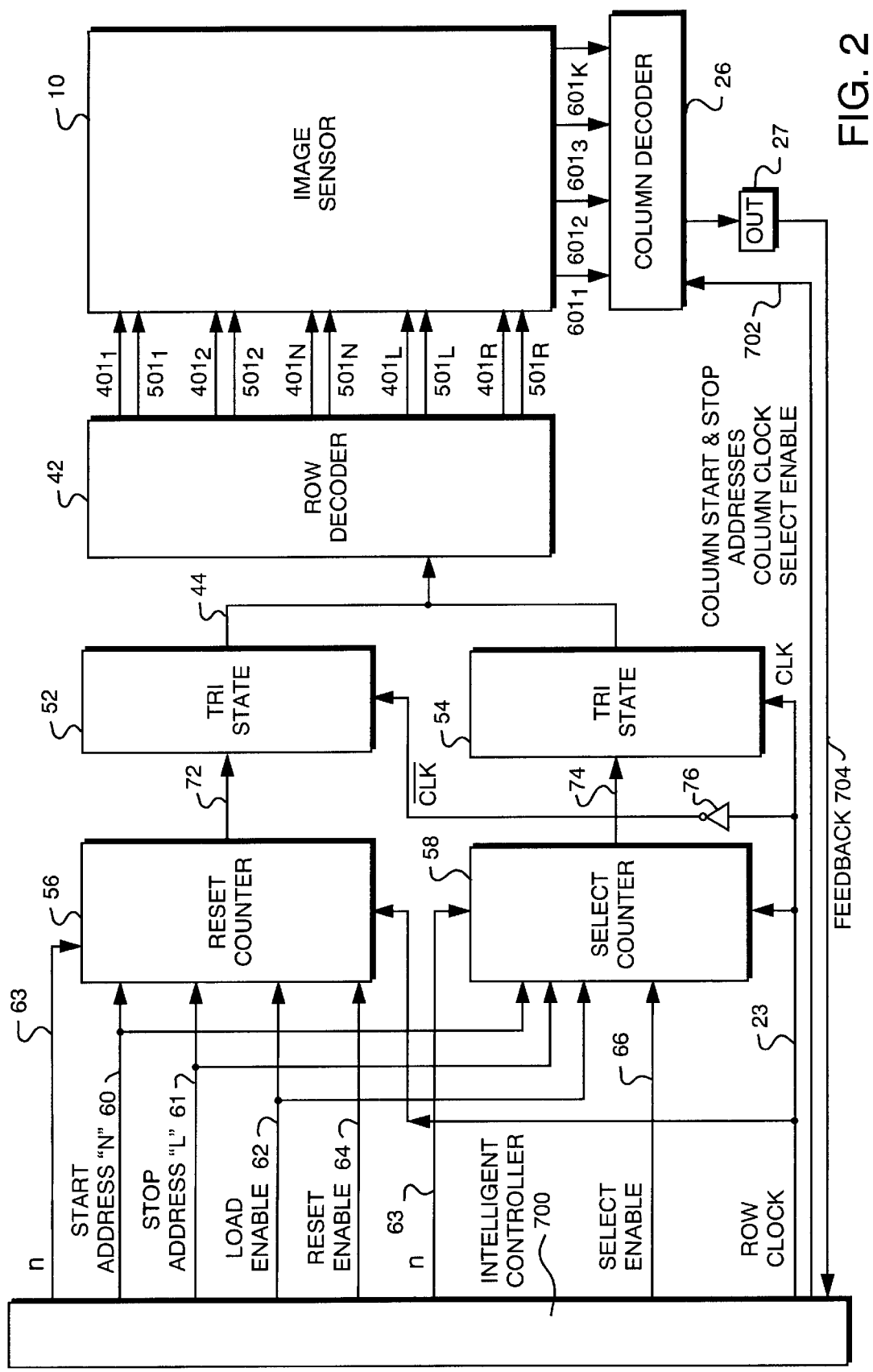
FIG. 2 a schematic block diagram of an exposure control system of the invention.

The objects of the invention are attained by the embodiment depicted in FIG. 2. First, for addressing the columns and rows, respectively, decoders 26, 42 are used instead of the shift registers 16 and 12, 14 of FIG. 1. Each of the R rows of pixels of the image sensor 10 is connected to the row decoder 42 via a pair of row signal lines, for a total for the image sensor 10 of 2×R row signal lines. Of each pair of row signal lines, one row signal line is connected to the select enable line of the respective row of the CMOS image sensor 10, e.g. the first row signal line $401_1$ to the select enable line of the first row; the other row signal line, i.e. in this example the first row signal line $501_1$, is connected to the reset enable line of the respective row of the CMOS image sensor 10, in this example also row one. The row decoder 42 thus supplies logical select enable signals via the row select lines $401_1$, $401_2$, ..., $401_N$, ..., $401_L$, ..., $409_R$ and logical reset signals via the row reset lines $501_1$, $501_2$, ..., $501_N$, ..., $501_L$, ..., $509_R$ to the R rows of pixels of the CMOS image sensor 10.

The word addresses received at the input of the row decoder 42 are generated by a reset counter 56 and a select counter 58, respectively. The functions of the respective counters 56, 58 are controlled by an "intelligent" controller 700 which supplies to the respective counters 56, 58 the following signals: a START ADDRESS 60 for identifying the first row of the CMOS image sensor 10 to be addressed, a STOP ADDRESS 61 for identifying the last row of the CMOS image sensor 10 to be addressed, a LOAD ENABLE signal 62 for loading the START and STOP addresses into respective registers in the respective counters 56, 58, optionally at input 63 a row increment value n specifying the value by which the respective counters 56, 58 are incremented at each row clock cycle of a clock 23 (e.g. by 1 to sequentially address each row, 2 to address every other row, etc.), and RESET ENABLE 64 and SELECT ENABLE signals 66. When the respective ENABLE signals 64, 66 are set to "HIGH" (i.e. a logical 1), then the respective counters 56, 58 are enabled and increment at each row clock cycle by n the word addresses at the respective outputs 72, 74 of the respective counters 56 and 58. The input signals to the select and reset counters 56, 58, i.e. the LOAD ADDRESS 60, LOAD ENABLE 62, RESET ENABLE 64 and SELECT ENABLE 66, clock pulses, etc., which are supplied by the controller 700, can be implemented in hardware or in software residing in the controller 700 or in an external computer (not shown).

The word address (i.e. row address) supplied at the output of each of the respective counters 56, 58 is transmitted, together with the respective RESET ENABLE or SELECT ENABLE signals 64, 66, via an associated set of tri-state buffer amplifiers 52, 54, respectively to the input of row decoder 42 via respective signal bundle lines 72, 74 and 44. Tri-state buffer amplifiers are generally designed to provide three different output states: a first low impedance output state providing a logical 0 and second low impedance output state providing a logical 1, and a third high impedance output state. In the present embodiment, switching between the low impedance output state and the high impedance output state in tri-state buffer amplifiers 52, 54 is accomplished by the row clock signal 23. When row clock signal 23 is "HIGH" (CLK), then the set of tri-state buffer amplifiers 54 is "conductive", i.e. supplies the word address and the SELECT ENABLE signal 66 received from select counter 58 to row decoder 42. At the same time, the inverted clock signal is supplied to the set of tri-state buffer amplifiers 52 which is now "open" and has an infinitely high output impedance, and consequently does not affect the output signal supplied by the set of tri-state buffer amplifiers 54 on the common row address line 44c of signal bundle line 44 (see FIG. 4). Conversely, during the next half clock cycle, CLK goes to "LOW" and the opposite of the foregoing situation occurs. $\overline{CLK}$ is now "HIGH" and the set of tri-state buffer amplifiers 52 is "conductive", i.e. supplies the word address and the RESET ENABLE signal 64 received from reset counter 56 to row decoder 42. The set of tri-state buffer amplifiers 52 is now "open." As a result, row decoder 42 receives alternately, i.e. depending on the clock cycle, signals comprising a respective word addresses of a specific row in conjunction with either the logical RESET ENABLE signal 64 or the SELECT ENABLE signal 66.

As an example, if the row (word) address at the output of reset counter 56 is "L" and the row (word) address at the output of select counter 58 is "N", and if both the RESET ENABLE signal 64 and the SELECT ENABLE signal 66 are "HIGH", then select line $401_N$ will be asserted (i.e. set to a logical 1 or "HIGH") on CLK and reset line $501_L$ will be asserted on $\overline{CLK}$. If one. or both of the SELECT and RESET ENABLE signals 66, 64 are "LOW", then the respective select or reset lines $401_N$ and $501_L$ will not be asserted.

The method for addressing the CMOS image sensor 10 illustrated in FIG. 2 will now be described in greater detail with reference to FIG. 3. For the sake of simplicity, it will be assumed in the following example, but without limiting the scope of the invention, that n is equal to 1.

Figure 3:
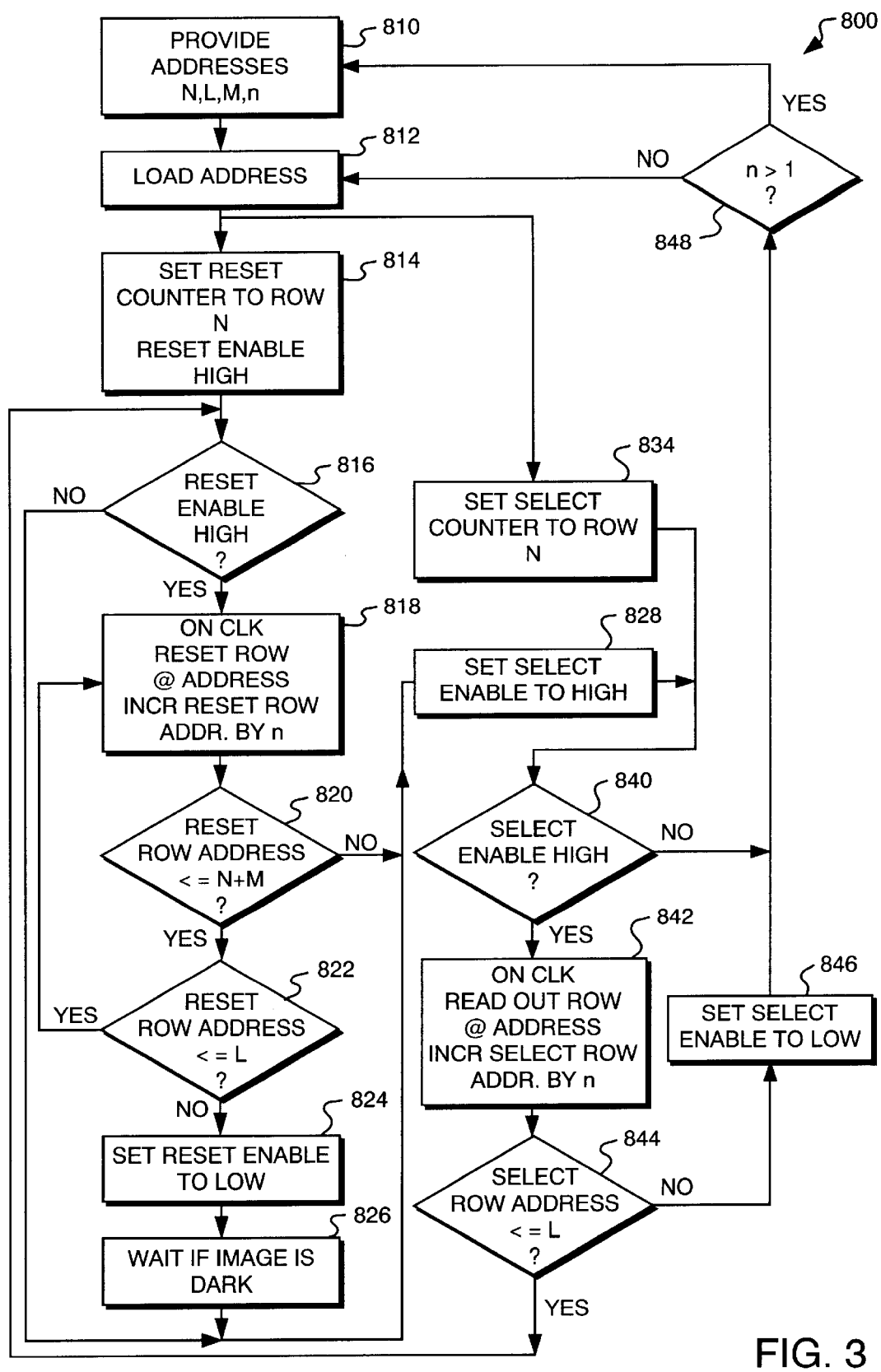
FIG. 3 a flow diagram for an exposure control system of the invention.

Referring now to FIG. 3, there is shown a flow diagram 800 wherein the aforedescribed START address word 60 ("N") and the STOP address word 61 ("L"), the "height" of the rolling focal plane shutter expressed as number of rows ("M"), the row increment value n and possibly the clock signal CLK are provided in step 810. In step 812, the addresses are loaded into the reset counter 56 (step 814) and simultaneously into the select counter 58 (step 834). Both the reset counter and the select counter will begin counting upward from the START address 60 to the STOP address 61 once the respective signals RESET ENABLE 64 and SELECT ENABLE 66 are set to "HIGH". With the START address "N" loaded into the reset counter 56, RESET ENABLE 64 is set to "HIGH". Since RESET ENABLE in step 816 is "HIGH", row "N" is reset in step 818 during the negative going clock signal $\overline{CLK}$ and the row number is incremented by n (hereafter assumed to be equal to 1) after reset. In branch point 820, it is checked if the reset row address is less than or equal to "N+M", meaning that it is checked if the last row in the presently defined rolling focal plane shutter window has been reset. If the reset row address is less than or equal to "N+M", then it is checked at branch point 822, if the row address last reset is less than or equal to "L", i.e. the STOP address 61. If this is the case, then the process will loop back to 818 on the next row clock cycle. If the last row "L" has been reset, then 822 branches to 824 where RESET ENABLE 62 is set to "LOW". A waiting period is introduced in step 826 if the illumination level is too low and the shutter will have to be kept open longer than the frame time for proper exposure, i.e. the pixels in rows between "N" and "L" can be exposed to the radiation for longer than the frame time.

If the row address following the last row address reset in step 820 is greater than "N+M", i.e. the entire "height" of the rolling focal plane shutter has been reset, then the first row "N" in the frame will be read out during the next positive row clock pulse CLK. This is accomplished by branching from step 820 to step 828, where SELECT ENABLE 66 is set to "HIGH".

After step 826 or alternately, if the reset row address in step 820 is larger than "N+M" as described above, then in step 828 SELECT ENABLE 66 is set to "HIGH" and the pixel data in row "N" are read out in step 842 during the positive row clock signal CLK supplied by row clock 23. The function of step 840 is to increment the row address of the select counter 58 only in the event that SELECT ENABLE 66 is "HIGH". After row "N" has been read out by the column decoder 26 in step 842, the row address in the select counter 58 is incremented by n (=1). After the last row "L" has been selected and read out, 844 branches to 846 where SELECT ENABLE 66 is set to "LOW" and new addresses are loaded or the previous addresses are reloaded into the reset and select counters 56, 58, respectively. Alternately, if the select row address is less than or equal to "L", i.e. the last row of the rolling focal plane shutter has been read out without reaching the STOP ADDRESS "L" of the frame, then the process branches to the input of step 816. At this point, both RESET ENABLE 64 and SELECT ENABLE 66 are "HIGH", and the process described in the foregoing repeats until all rows inside the defined frame have been reset and subsequently read out.

In the present embodiment, the same START and STOP addresses 60, 61 ("N" and "L", respectively) are provided to the input of both the reset counter 56 and the select counter 58. "N" can be any number between 1 and the maximum number of rows R of the CMOS image sensor 10. Similarly, the STOP ADDRESS 61 "L" can be any number greater than N. and smaller than the maximum number of rows R of the CMOS image sensor 10. The addresses 60, 61 may be loaded asynchronously. The waiting time in step 826 can be computed in known ways by the controller 700 from the output values at output 27.

It is evident from FIGS. 2 and 3 that the elapsed time between resetting a certain row N and reading out that same row N through column decoder 26 is exactly M row clock cycles, unless a waiting time is introduced. Row clock rates for an imager having 780 rows are typically on the order of 1–10 MHz, but may also be higher or lower, depending on the desired operating environment. Consequently, the effective exposure time of the CMOS image sensor 10 can be advantageously adjusted by simply adjusting the number of clock cycles between the RESET ENABLE 64 and the SELECT ENABLE 66 signals. For example, for a high illumination level M would preferably be selected to have small value, and conversely, for a low illumination level M would preferably be selected to have larger value less than or equal to the total number of rows R of the CMOS image sensor 10.

It is evident from the foregoing that the rolling focal plane exposure control system of the invention can advantageously also be used for reading partial frames, i.e. a specific image area located within the image sensor area. If, for example, a vertical area in the center of the image sensor 10 extending over ⅓ of the total image sensor height are to be read, then N=⅓×R, L=⅔×R, wherein M can be any number <⅓ R. A horizontal area extending over the partial width of the image sensor can be selected in a similar fashion by addressing the column decoder 26 accordingly.

Another advantage of the invention, as already mentioned above, is that a dark scene of interest, i.e. a scene having a low illumination level and possibly requiring an exposure time which is longer than the frame time, can be exposed and read out using the same control system by simply modifying the input parameters supplied by the controller 700, i.e. by adding a waiting time. The waiting time may be implemented either by not supplying the row clock pulses to the counters 56, 58 during this time or by setting reset enable 64 to "LOW". During the waiting time, the charge stored in the pixels of image sensor 10 changes. In this way, an arbitrarily long integration time, only limited by other parameters of the image sensor, such as for example noise, can be achieved.

Advantageously, the output 27 containing exposure information can be fed back to the controller 700 via feedback line 704 and used to adjust the START 60 and STOP 61 addresses to change to image size and/or to adjust the time delay between the RESET ENABLE 64 and SELECT ENABLE 66 signals to change the height of the rolling focal plane shutter and thereby the pixel exposure time. It is apparent that features in certain regions of an image can also be monitored and adjusted (e.g. with respect to exposure time) in this manner.

The invention can also advantageously be used for providing customized readout wherein, for example, a 512×768 pixel imager would be operated in 256×384 pixel mode. This is accomplished by, for example, setting the increment value 63 to n=2. Alternatively, the CMOS image sensor 10 could be operated in an interlaced mode by setting the increment value 63 to n=2 and by toggling the START address 60 "N" and the STOP address 61 "L" between two adjacent values after every (L-N)/2 row clock cycles in steps 848 and 810 of FIG. 3. Conceivably, rows could also be addressed at random by loading different addresses after an arbitrary number of clock cycles.

Figure 4:
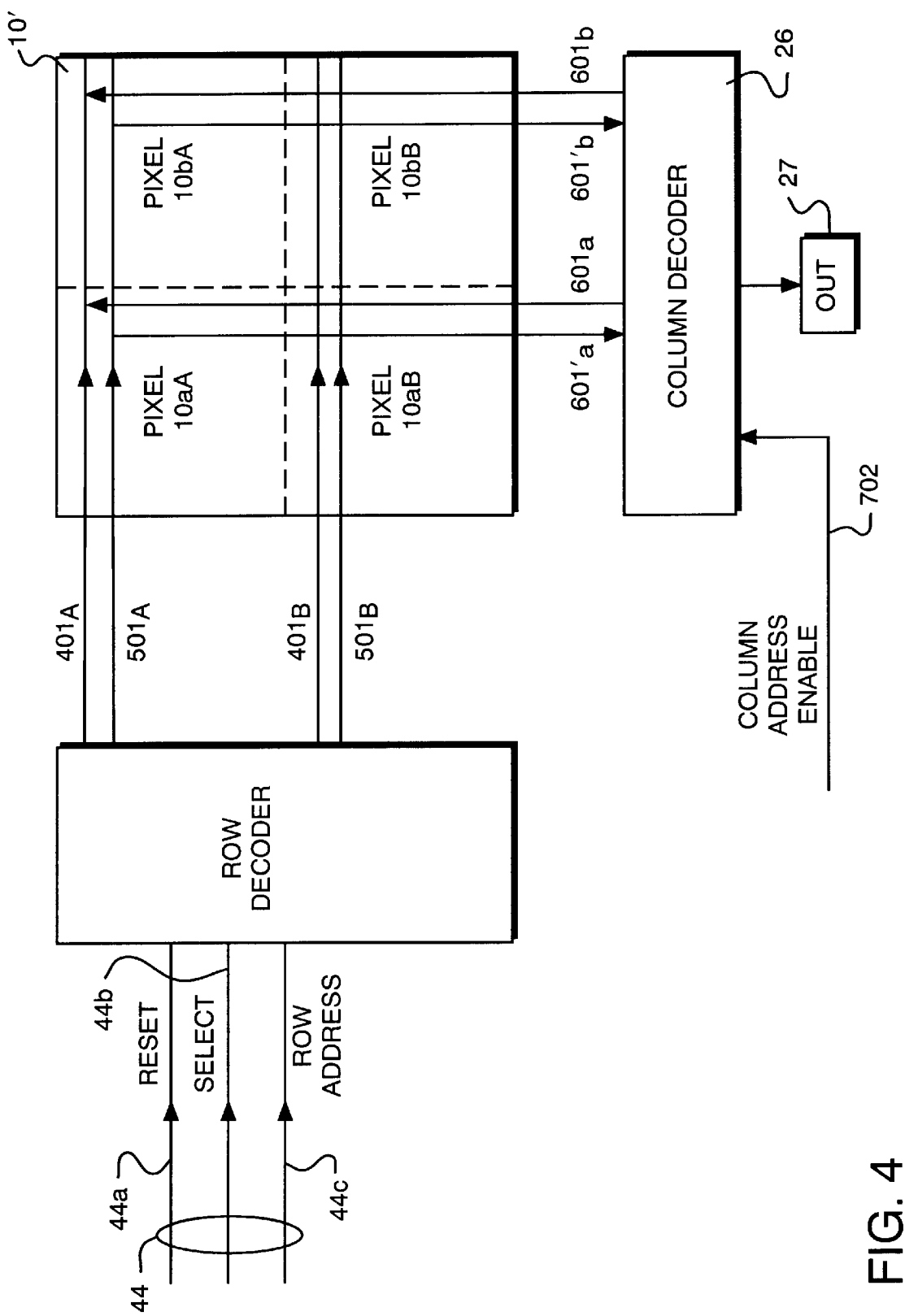
FIG. 4 the CMOS imager of FIG. 2 depicting four representative pixels.

FIGS. 4 illustrates schematically, but in greater detail, the connections of the different signal lines to the row and column inputs to a section 10' of the CMOS image sensor 10 of FIG. 2. Pixels 10aA and 10bA in row A and columns a and b, respectively, are reset by supplying the word "A" to input 44c of the row decoder 42 in conjunction with a logical 1 to the reset input 44a. The inputs 44a, 44b and 44b form, as noted above, the signal bundle 44 of FIG. 2. The output of the row decoder 42 then provides the logical signal via the row reset line $501_A$ for resetting the two pixels in row A. The column decoder 26 has no function during reset.

The pixel 10aA is selected for readout by supplying the word "A" to input 44c of the row decoder 42 in conjunction with a logical 1 to the select input 44b. In the case for readout, column a is selected in the column decoder 26 by supplying the word "a" to input 701 of the column decoder 26. The column decoder 26 then selects the pixels in column a via the column select line $601_{a1}$. The charge stored in pixel 10aA is then read out by the respective signal line $601_{a2}$ and supplied to output 27. As discussed before, the respective column select lines and the column signal lines in FIG. 1 (denoted 301) and in FIG. 2 (denoted 601) are shown for the sake of clarity as a single line and not as separate lines as in FIG. 4; lines 301 and 601, respectively, should however be understood to represent line pairs.

For a more detailed discussion of embodiments of pixels and the connections between the pixels 10aA, 10bA, 10aB, 10bB and the address, reset and select lines, respectively, specific reference is made to FIGS. 1 and 3 of the above-referenced U.S. patent application Ser. No. 08/595,981.

The present invention was discussed with reference to a CMOS image sensor. The signals applied to the inputs of the image sensor can be voltages or currents.

However, the invention is not limited to CMOS image sensors and can conceivably also be used for CCD image sensors or other devices where a similar functionality is desired.

What is claimed is:

1. A control system for controlling the exposure to incident optical radiation of an active pixel image sensing device having a plurality of image signal generating pixels arranged in horizontal rows and vertical columns to form of a two-dimensional matrix, each row and column, respectively, having a respective row and column address, wherein the pixels in each horizontal row are connected to a first common horizontal reset line and a second common horizontal select line and the pixels in each vertical column are connected to a common vertical signal line, the control system comprising:

a single row decoder connected to each of said horizontal reset lines for resetting image signals of the pixels of a row connected to a predetermined one of said horizontal reset lines; said single row decoder also connected to each of said horizontal select lines for also selecting a predetermined one of said horizontal select lines for enabling image signals from pixels in the row connected to said selected select line to be read out; horizontal addressing means connected to each of said vertical signal lines for selecting a predetermined one of said vertical signal lines and for reading out the signal of the pixel simultaneously selected through said horizontal select lines and said vertical signal lines;

control means connected to said horizontal addressing means and said single row decoder for controlling said horizontal addressing means and said single row decoder so that said single row decoder selects a first one of said horizontal reset lines to reset the image signals of the pixels of that row connected to said first one of said horizontal reset lines, and thereafter selects a second one of said horizontal select lines to enable the image signals of the pixels of that row connected to said second one of said horizontal select lines to be read out, wherein said second one of said horizontal select lines is spaced apart from said first one of said horizontal reset lines by a predetermined number of horizontal select lines, and said horizontal addressing means selects in ordered sequence predetermined ones of said vertical signal lines to read out in said ordered sequence the image signals from the pixels of that row connected to said second one of said horizontal select lines, reading out in said ordered sequence the signals from the pixels simultaneously selected through said second one of said horizontal select lines and said vertical signal lines, said control means thereafter operating to control said single row decoder to alternately select succeeding predetermined ones of said horizontal reset and select lines and to control said horizontal addressing means to select predetermined ones of said vertical signal lines in said ordered sequence to read out the image signals from the pixels of the succeeding rows connected to the selected horizontal select lines, reading out in said ordered sequence the signals from the pixels simultaneously selected through said succeeding predetermined one of said horizontal select lines and said predetermined ones of said vertical signal lines;

said control means comprising:

a control circuit for generating row and column addresses and control signals for controlling said row decoder and said horizontal addressing means; and two sets of tri-state buffer amplifiers, the input of each of the sets of tri-state buffer amplifiers connected to the output of the control circuit for receiving row addresses corresponding to the horizontal lines to be reset or selected and control signals from the control circuit, and the output of each of the sets of tri-state buffer amplifiers connected to the input of the row decoder for conveying said row addresses and control signals to the row decoder, each of said tri-state buffer amplifiers capable of switching between one of two low impedance output states and a high impedance output state in response to at least one of the control signals from the control circuit;

means for generating a first row address and a second row address and column addresses and respective control signals and conveying said first row address and at least one of said respective control signals to a first one of said set of tri-state amplifiers and conveying said second row address at least one other of said respective control signals to a second one of said set of tri-state amplifiers, said row decoder alternately receiving from the output of said first one of the sets of tri-state buffer amplifiers the first row address and the at least one respective control signal and from the output of said second one of the sets of tri-state buffer amplifiers the second row address and said at least one other respective control signal;

means for alternately selecting one of the two tri-state amplifiers, the output of said selected amplifier being received by the decoder.

2. The control system of claim 1, wherein each succeeding one of said horizontal reset lines and of said horizontal select lines selected by said single decoder is adjacent to the respective preceding selected one of said horizontal reset lines and to the respective preceding selected one of said horizontal select lines.

3. The control system of claim 1, wherein each succeeding one of said horizontal reset lines and of said horizontal select lines selected by said single decoder is spaced apart by at least one row from the preceding selected one of said horizontal reset lines and to the preceding selected one of said horizontal select lines, respectively.

4. The control system of claim 1, wherein the row addresses supplied to the single decoder by the control means comprise a row start address and a row stop address, with the rows located between said row start and row stop addresses defining a vertical frame.

5. The control system of claim 4, wherein the number of rows located between the row connected to said predetermined first one of said horizontal reset lines and the spaced apart row connected to said predetermined second one of said horizontal select lines is less than the number of rows in the frame and defines a shutter height.

6. The control system of claim 5, wherein said shutter height is changed by the control means in response to the image signals of the pixels received by the control means from the horizontal addressing means.

7. The control system of claim 1, wherein the image sensing device is a current-mediated active-pixel image sensing device, said current-mediated active-pixel image sensing device comprising a reference current source and an output current mirror.

8. A method for controlling the exposure to incident optical radiation of an active pixel image sensing device having a plurality of image signal generating pixels arranged in horizontal rows and vertical columns to form of a two-dimensional matrix, each row and column, respectively, having a respective row and column address, the rows between two row addresses, a row start and a row stop address, defining a vertical frame, wherein the pixels in each horizontal row are connected to a first common horizontal reset line and a second common horizontal select line and the pixels in each vertical column are connected to a common vertical signal line, the method comprising the steps of:

a) resetting the image signals of the pixels of a predetermined first row located within the vertical frame via the respective horizontal reset line of said predetermined first row by means of a single decoder and control means, said control means comprising two sets of tri-state buffer amplifiers and means for alternately selecting one of the two tri-state amplifiers, the output of said selected amplifier being received by the decoder;

b) thereafter selecting, via the respective horizontal select line, a predetermined second row spaced apart from said first row and located within said vertical frame for enabling image signals from pixels in the predetermined second row to be read out by means of said single decoder and control means, said control means comprising two sets of tri-state buffer amplifiers and means for alternately selecting one of the two tri-state amplifiers, the output of said selected amplifier being received by the decoder c) sequentially selecting columns in a predetermined order and reading out in said predetermined order the image signal of the pixel simultaneously selected in said predetermined second row and in said selected column; and d) selecting new predetermined first and second row addresses for said predetermined first row and said predetermined second row; and e) repeating steps a) through d) at least until the image signals of the pixels of all rows in the frame are read out.

9. The method according to claim 8, wherein said the number of rows between said predetermined second row address and said predetermined first row address is less than the number of rows in the frame.

\* \* \* \* \*